United States Patent [19]

Argereu

[11] 4,119,188

[45] Oct. 10, 1978

[54] SELECTABLE SIZE CENTRIFUGAL CLUTCH

[76] Inventor: William Argereu, Hickory Dr., North Scituate, R.I. 02857

[21] Appl. No.: 756,760

[22] Filed: Jan. 5, 1977

[51] Int. Cl.² .............................................. F16D 43/18
[52] U.S. Cl. .............................. 192/105 BA; 188/185
[58] Field of Search ........ 192/105 A, 103 B, 105 BA, 192/105 CD; 73/539; 188/185

[56] References Cited

U.S. PATENT DOCUMENTS

| 2,243,565 | 5/1941 | Kimball et al. | 192/105 BA |
| 2,596,359 | 5/1952 | Bartlett | 192/105 CD |
| 2,809,535 | 10/1957 | Hein et al. | 192/105 BA X |
| 3,565,224 | 2/1971 | Argereu | 192/105 BA |

Primary Examiner—Benjamin W. Wyche
Attorney, Agent, or Firm—Barlow & Barlow

[57] ABSTRACT

A clutch having weights which centrifugally expand and selectable resilient sleeves of different external diameters but of the same internal diameter for axially positioning over the centrifugal expandable weights to vary the size of the bobbins or the like to be rotated.

3 Claims, 6 Drawing Figures

SELECTABLE SIZE CENTRIFUGAL CLUTCH

BACKGROUND OF THE INVENTION

This centrifugal clutch is along the lines of the inventor's previous U.S. Pat. No. 3,565,224 dated Feb. 23, 1971, which is adapted for use for one size of bobbins.

SUMMARY OF THE INVENTION

This centrifugal clutch has a resilient body formed by a sleeve which may be axially positioned over the centrifugal expandable weights and axially removed therefrom. There are several different sleeves each for a different size of bobbin, one of which is to be utilized. The different sleeves may be interchanged as occasion may require for different size bobbins to be rotated.

DESCRIPTION OF THE PREFERRED EMBODIMENT

Figure 1:
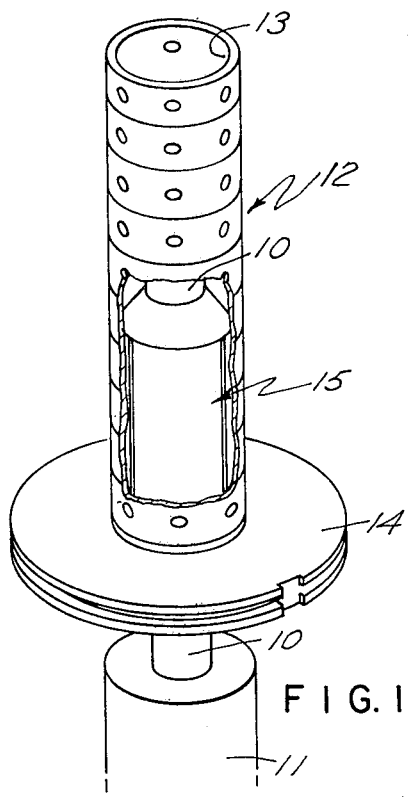
FIG. 1 is a perspective view illustrating a bobbin broken away and the centrifugal clutch of this invention shown within the bobbin.

In the drawings 10 designates a spindle driven by a hub portion 11 upon which a bobbin designated generally 12 is mounted for rotation. This bobbin 12 has a tubular core with internal diameter 13 and which rests upon a head 14 and which is engaged by a centrifugal clutch fixed to the spindle and designated generally 15 which clutch is the subject of this invention.

Figure 4:
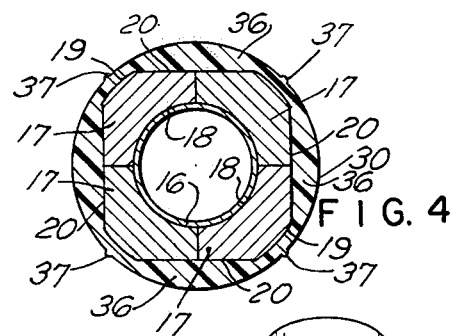
FIG. 4 is a section on line 4—4 of FIG. 2.

This clutch 15 has a tubular core 16 of metal stock which is surrounded by weights 17, in this case there being four, such weights having an arc 18 generally conforming to the core 16 and each of which has an arcuate surface 19 from which extends on either side flat portions 20 of lesser radius. The flat portions of adjacent weights align when the weights are in contracted position as shown in FIG. 4. Each of the weights is radially reduced from its outer surface inwardly at its upper and lower ends 21 (FIG. 2) and a cap 22 recessed as at 23 extends over this reduced portion of the weight at the upper end and a similar cap 24 at the lower end extends over these reduced portions of the weights limiting their radial expansion yet providing a certain looseness permitting the weights to expand radially by centrifugal force as the core rotates. Each of the caps 22, 24 has a screw 25 threaded radially through it and also through an opening 26 in the core so that this screw may engage the spindle 10 and secure the assembly thereto so that as the spindle rotates the clutch will rotate. Above and below also each of the caps the core is recessed as at 27 so as to receive a split circular ring 28 to hold the caps in position against axial movement along the core. Access is provided to the Allen head of screw 25 through hole 29 in the sleeve 30 or 31.

Figure 2:
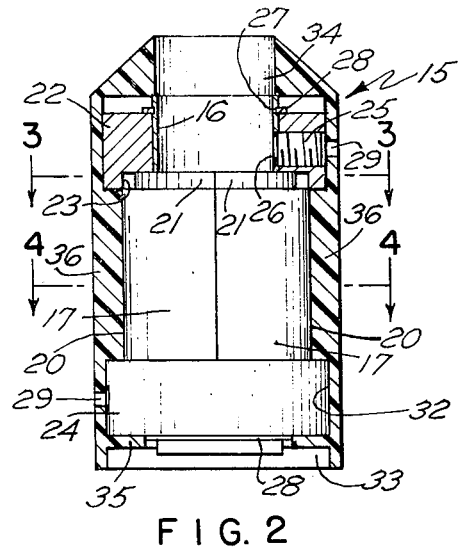
FIG. 2 is a partial sectional view through different parts of the centrifugal clutch and sleeve showing some parts in section and other parts in full.
Figure 3:
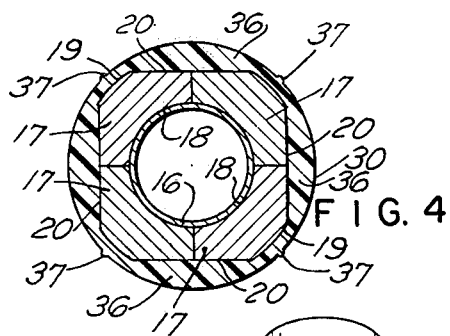
FIG. 3 is a section on line 3—3 of FIG. 2.
Figure 5:
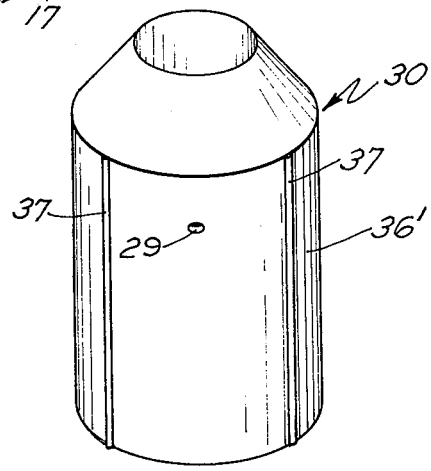
FIG. 5 is a perspective view of a sleeve of one size.
Figure 6:
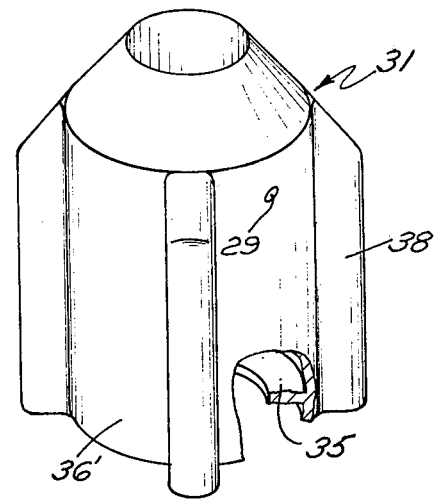
FIG. 6 is a perspective view of a sleeve of another size for assembly about the centrifugal weights of the clutch.

The sleeves such as shown as 30 and 31 in FIGS. 5 and 6 have an internal diameter 32 as shown in FIG. 2 and a relatively open end 33 and a relatively closed end 34 as shown in FIG. 2. A flange 35 extends inwardly at the lower end. This entire sleeve is of an elastic structure and may be stretched sufficiently to have its relatively open end 33 drawn over the weights and caps so as to snugly embrace the weights as shown in FIGS. 3 and 4 and contract the weights inwardly. The flange 35 is spaced sufficiently from the closed end 34 so that it will extend inwardly below the lower cap 24 extending beneath it as shown in FIG. 2, while the upper or closure end will engage the core and limit the axial sliding of the sleeve along the weights from the upper end. The inner surface of each of the sleeves is of the same size and is provided with an integral inward projection 36 with flat inner surfaces extending into and against the flattened portions of adjoining weights and are of an axial length just short of the distance between the caps 22, 24 and thus prevent the sleeve from rotation relative to the weight and also limit the axial movement of the sleeve along the clutch. This is so that the outer arcuate surface of the weights will always engage at the proper location with the sleeve.

The outer surface of each of these sleeves is formed generally circular as at 36' but has ribs 37 extending outwardly at a plurality of points, here shown as four. In FIG. 5, the ribs 37 extend just slightly from the circular surface 36' whereas in FIG. 6 the ribs 38 extend a substantial distance from the circular surface 36' and thus provide a larger diameter for engagement with the core of the bobbin which is to have strand material wound thereon.

If it is desired to drive a bobbin such as 12, it is necessary to have the internal surface 13 substantially close to the outer diameter of the clutch which is to engage it. Bobbins vary in inner diameter, such as 13, and thus in order to select the proper size clutch, it is desirable, as here provided, to select the desired size sleeve which although it has the same internal diameter to engage the weights will have an external diameter of different sizes to engage the inner surface of the bobbin 12. When the desired size of bobbin to be driven is known, the desired sleeve may be selected and positioned on the weights such as heretofore described. Rotation causes centrifugal expansion of the weights and expansion of the elastic sleeve to grip the bobbin and drive it.

If it is desired to change from one size bobbin of internal diameter different from another, then the sleeve may be axially withdrawn, being very elastic, and another size sleeve may be positioned on the weights. Thus it is unnecessary to have a complete clutch for each different size bobbin to be driven but only necessary to have the sleeves necessary to fit the bobbin desired.

I claim:

1. The method of providing a centrifugal clutch for varying size bobbin which comprises providing radially expandable weights about a core, providing a plurality of elastic sleeves of different external diameters but each of the same internal diameter to fit over said core and weights, selecting the desired sized bobbin and selecting the desired external size sleeve to fit the selected bobbin and assembling the selected sleeve over said core and weights with the internal diameter of said sleeves snugly embracing and contracting said weights, and inserting the selected bobbin over the selected sleeve.

2. A centrifugal clutch comprising a tubular core, means to secure said core to a spindle, a plurality of weights disposed symmetrically about said core, means to mount each of said weights for radial expansion with reference to said core, and an elastic sleeve snugly embracing and contracting said weights radially inwardly, said weights having an axially extending circumferential flattened portion along their outer surface and said sleeve has inwardly extending projections with flat surfaces of substantial area engaging said flattened portions of said weights.

3. A centrifugal clutch comprising a tubular core, means to secure said core to a spindle, a plurality of weights disposed symmetrically about said core, means to mount each of said weights for radial expansion with reference to said core, and an elastic sleeve snugly embracing and contracting said weights radially inwardly, said weights having an axially extending end portion reduced in radial thickness and a cap about the end portion of said weights, said cap having an axially extending skirt-like projection embracing said reduced portion to prevent the weight from separating from the core.

* * * * *